United States Patent

[15] 3,644,021

Hamby

[45] Feb. 22, 1972

[54] ADJUSTABLE VEHICLE MIRROR

[72] Inventor: Robert L. Hamby, Dodge City, Kans.

[73] Assignee: Richard A. Wolfe, Dodge City, Kans. a part interest

[22] Filed: May 11, 1970

[21] Appl. No.: 36,011

[52] U.S. Cl. .................................................350/304, 248/481
[51] Int. Cl. ..............................................................G02b 5/08
[58] Field of Search........................................350/302–307; 248/481–484

[56] References Cited

UNITED STATES PATENTS

| | | | |
|---|---|---|---|
| 3,424,424 | 1/1969 | Kelley | 350/299 |
| 2,649,028 | 8/1953 | Lenta | 350/304 |
| 3,480,350 | 11/1969 | Hamby | 350/304 |
| 3,142,469 | 7/1964 | Clemmer | 350/307 |
| 3,048,084 | 8/1962 | Iannuzzi | 350/304 |

Primary Examiner—David Schonberg
Assistant Examiner—Michael J. Tokar
Attorney—Clarence A. O'Brien and Harvey B. Jacobson

[57] ABSTRACT

A rear vision mirror assembly for support from one side portion of a vehicle. The assembly includes a main upstanding mirror section of greater height than width and supported from a suitable support at two vertically spaced points for oscillation about an upstanding axis. The assembly further includes at least one upstanding secondary mirror section supported in vertically spaced relation relative to the main section by a ball and socket structure disposed between the main section and the secondary section whereby the secondary section may be universally adjusted relative to the main section.

4 Claims, 4 Drawing Figures

PATENTED FEB 22 1972

Robert L. Hamby
INVENTOR.

BY *Clarence A. O'Brien*
and *Harvey B. Jacobson*
Attorneys

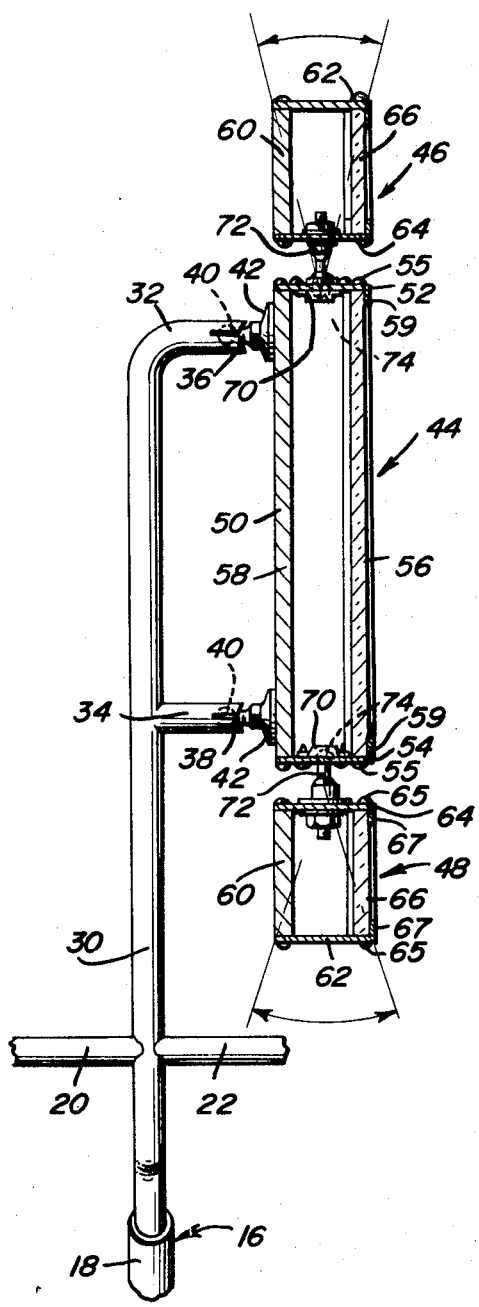
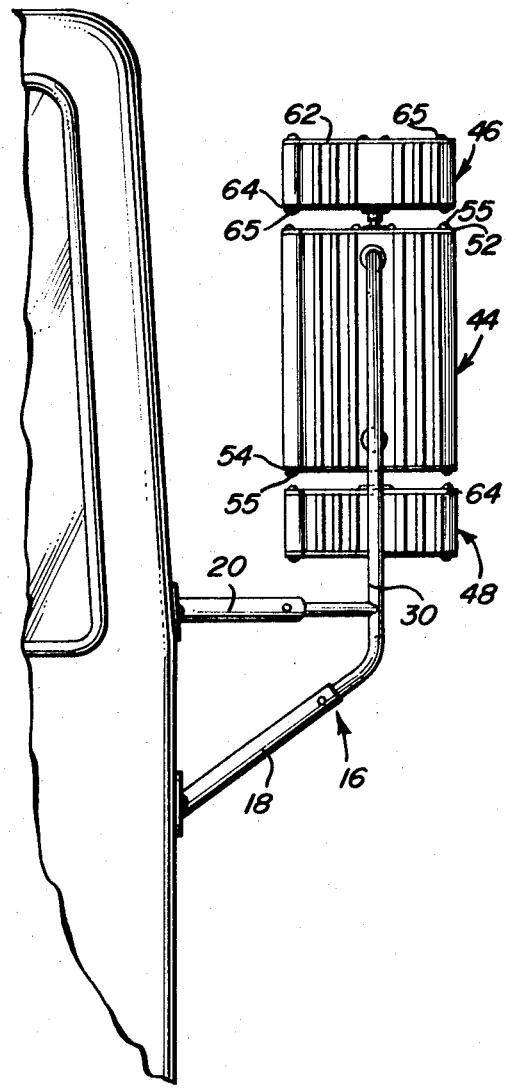
Robert L. Hamby
INVENTOR.

ADJUSTABLE VEHICLE MIRROR

The mirror of the instant invention is designed primarily for use on wide-load vehicles although it may also be utilized on other vehicles. The mirror further comprises an improvement over the vehicle mirror disclosed in my prior U.S. Pat. No. 3,480,350, dated Nov. 25, 1969.

The mirror of the instant invention includes at least two relatively universally supported mirror sections and one of the sections is designed to be supported from a support structure for oscillation about a vertical axis. This mirror section is vertically elongated in order that the driver of the associated vehicle may view not only the roadway directly behind his vehicle but also the rear upper portion of his vehicle as well as the ground alongside substantially the full length of his vehicle from a point extending rearwardly from a location spaced slightly rearwardly of the point of mounting of the mirror assembly upon his vehicle. Accordingly, due to the vertical elongation of this section of the mirror assembly and its mounting for oscillation about an upstanding axis the driver of the associated vehicle may adjust this main mirror section as desired according to the mounting location of the mirror relative to the driver's position of the vehicle and be afforded a directly rearward view alongside his vehicle through a vertical arc of appreciable extent.

The mirror assembly further includes at least one secondary mirror element disposed in vertically spaced relation relative to the main mirror section or element and supported therefrom by means of a ball and socket connection. The secondary mirror section may thus be universally adjusted relative to the main section as desired by the driver of the vehicle while he is moving the vehicle in reverse, if the driver desires to obtain a different line of vision than that which is afforded by the main mirror section.

The mirror assembly of the instant invention is designed so as to be of simple construction and thus durable as well as inexpensive and easy to repair.

The main object of this invention is to provide a compound mirror assembly for mounting on the side of a large vehicle and including relatively movable mirror elements specifically designed to provide a view to the rear of the vehicle and alongside the latter as desired by the driver of the vehicle.

Another object of this invention, in accordance with the immediately preceding object, is to provide a rear vision mirror assembly including a simple mounting structure for attachment to the side of the associated vehicle.

Yet another object of this invention is to provide a mirror assembly including a main mirror element or section for support for oscillation about a vertical axis and which is vertically elongated whereby the driver of the vehicle may adjust the main mirror section or element and be afforded a rearward view through an appreciable vertical arc whereby not only the roadway alongside the associated vehicle but also the upper rear portions of the corresponding side of the vehicle may be viewed.

Another important object of this invention is to provide a mirror assembly also including at least one secondary mirror element universally supported from the main mirror element or section thereby enabling the driver of the associated vehicle to obtain a varied rearward view then he is maneuvering his vehicle in reverse.

A final object of this invention to be specifically enumerated herein is to provide a rear vision mirror assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a fragmentary front elevational view of the assemblage illustrated in FIG. 1;

FIG. 4 is an enlarged fragmentary vertical sectional view taken substantially upon the plane indicated by the section line 4—4 of FIG. 1.

Figure 1:
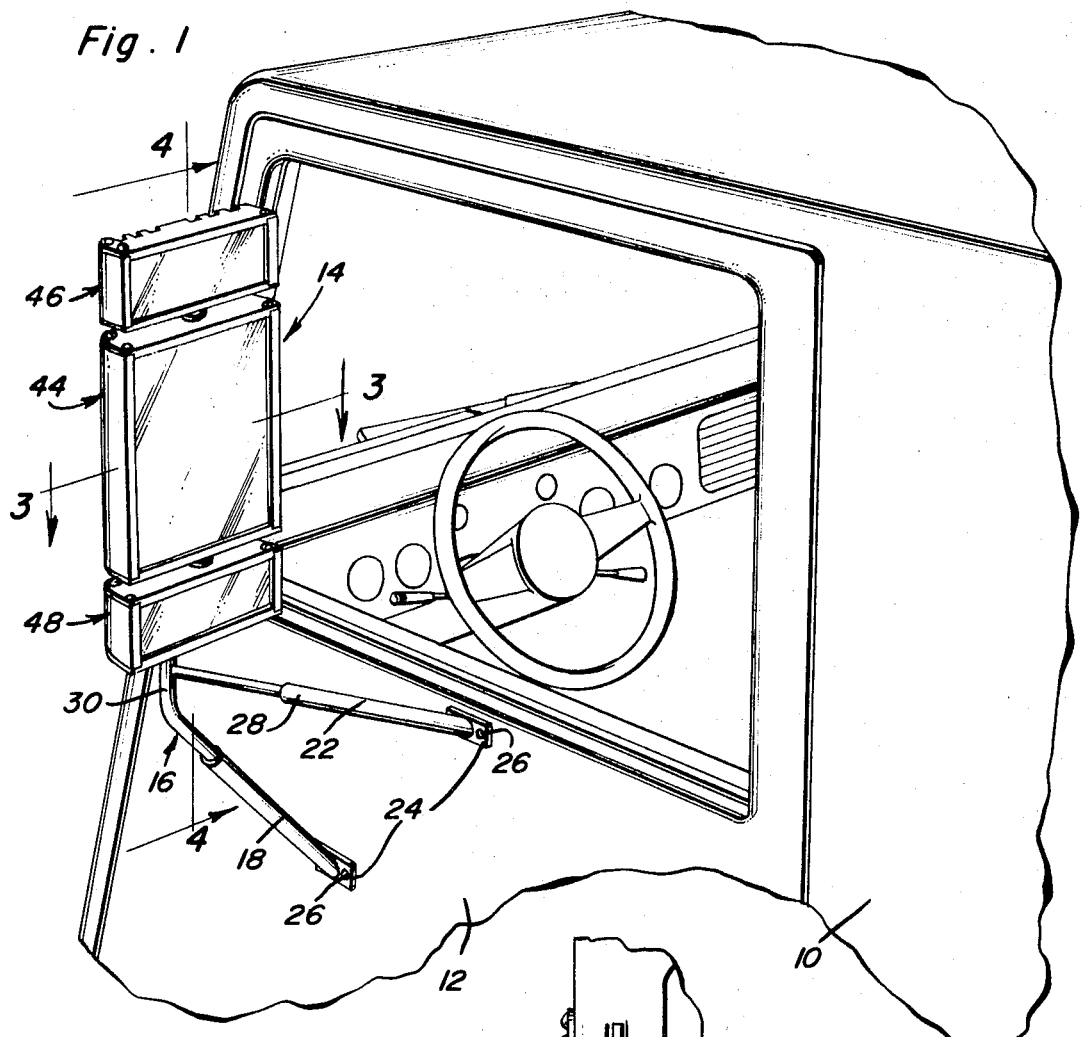
FIG. 1 is a fragmentary perspective view of a road vehicle with the mirror assembly of the instant invention mounted on the left-hand driver's door of the vehicle.
Figure 3:
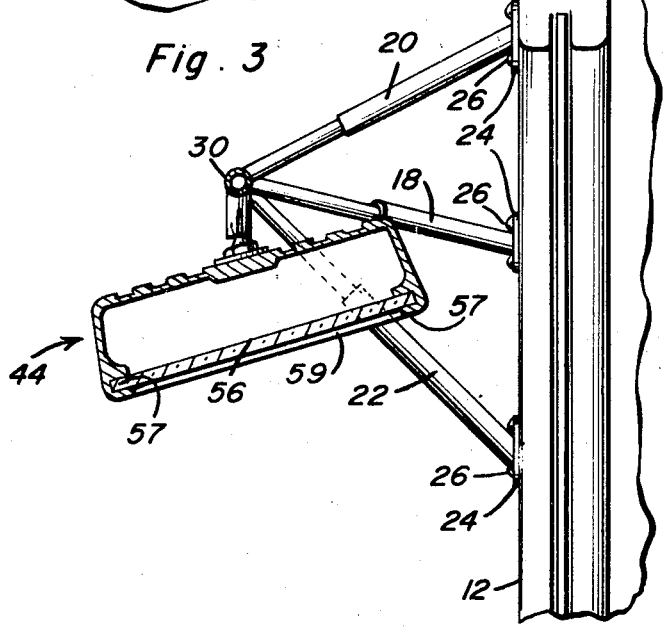
FIG. 3 is an enlarged fragmentary horizontal sectional view taken substantially upon the plane indicated by the section line 3—3 of FIG. 1.

Referring now more specifically to the drawings, the numeral 10 generally designates the cab portion of the tractor element of a tractor-semitrailer truck. The cab portion 10 includes a front left-hand driver's door 12 and the mirror assembly of the instant invention is generally referred to by the reference numeral 14 and illustrated as being supported from by door 12.

Although the mirror assembly 14 is illustrated as being mounted on the cab portion 10, it is to be noted that the mirror assembly 14 may be mounted upon various vehicles with which the mirror assembly is compatible.

The mirror assembly 14 includes a mounting structure referred to in general by the reference numeral 16 and including three adjustable length support arms 18, 20 and 22 including inner base ends provided with apertured mounting flanges 24 secured to the outer surface of the door 12 by means of suitable fasteners 26. The arms 18, 20 and 22 each include relatively telescopic sections secured in adjusted relative extended positions by means of setscrews 28. The support arms 20 and 22 are generally horizontally disposed and convergent toward their outer ends remote from the base ends thereof. The free convergent ends of the support arms 22 are secured to opposite side portions of an upper vertical extension 30 of the free end of the support arm 18, the latter being upwardly inclined toward its outer free end extension 30.

The extension 30 extends upward beyond the outer or free ends of the arms 20 and 22 and includes an upper rearwardly directed portion 32 as well as a lower rearwardly directed portion 34.

The free ends of the portions 32 and 34 define socket members 36 and 38, respectively, and each of the socket members 36 and 38 captively universally supports the ball element portion 40 of a corresponding anchor 42.

The mirror assembly 14 includes a main mirror section referred to in general by the reference numeral 44 and a pair of upper and lower secondary mirror sections referred to in general by the reference numerals 46 and 48.

The mirror section 44 includes a housing defined by an extruded channel member 50 including end walls 52 and 54 attached by means of fasteners 55 and a mirror 56 is slidingly supported within opposite side longitudinal grooves 57 defined by the housing 50 and between the end walls 52 and 54, which end walls include integral retaining flanges 59. The anchors 42 are secured to the opposite end portions of the bight portion 58 of the channel member 50 and the latter is vertically disposed whereby the mirror 56 is vertically elongated and the main mirror section 44 is thus supported for oscillation about a vertical axis extending between the ball element portions 40.

The secondary mirror sections 46 and 48 are identical, except for being inverted relative to each other, and each includes a shorter channel member 60 including end walls 62 and 64 attached by means of fasteners 65. A pair of mirrors 66 are slidingly received in the grooves of the channel members 60 and between the end walls 62 and 64 thereof, which end walls also include integral retaining flanges 67, and the secondary mirrors 46 and 48 are disposed above and below the main mirror section 44 in spaced relation relative to the upper and lower end walls 52 and 54 thereof.

The upper and lower end walls 52 and 54 have socket defining members 70 secured thereto and a pair of anchors 72 including ball-defining portions 74 are secured through the end walls 64 with the ball element portions 74 thereof captively retained in and universally supported from the socket members 70. Accordingly, the secondary mirror sections 46 and 48 are universally supported from the upper and lower ends of the main mirror section 44 in vertically spaced relation relative thereto whereby each of the mirror sections 46 and 48 may be individually universally adjusted in all directions relative to the main mirror section 44.

After the mirror assembly 14 has been attached to the door 12, the main mirror section 44 is oscillated about its vertical support axis until the correct positioning of the main mirror section 44 has been obtained. When the main mirror section 44 is properly adjusted, the driver of the truck will be afforded a directly rearward view along the side of his vehicle and he will be able to not only view straight rearwardly along his vehicle but also rearwardly and downwardly and rearwardly and upwardly along his vehicle. Then, the secondary mirror sections 46 and 48 may be adjusted as desired. As an example, the upper mirror section may be tilted forwardly so as to provide a view of the forward upper edge portion of the trailer portion of the vehicle and the mirror section 46 may be tilted forwardly at its lower portion to provide a rearward view which is sharply downwardly inclined. Of course, other adjustments of the secondary mirrors 46 and 48 may be obtained, when desired, in order to afford the driver of the vehicle different rearward views when the driver is maneuvering his vehicle in reverse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rear vision mirror assembly for support from one side portion of a vehicle, said assembly including a mount for securement to said side portion and a main upstanding mirror section of greater height than width supported from the mount for oscillation about an upstanding axis, said assembly further including at least one upstanding secondary mirror section supported from and disposed in vertically spaced relation relative to the main section by a ball and socket structure connected between said main section and said secondary mirror section and with said secondary mirror section independent of any other means of support for rotational and universal adjustment of said secondary mirror relative to said main mirror section, said one upstanding secondary mirror section being disposed above the main section and said mirror assembly including a second secondary mirror section spaced vertically below the main mirror section and universally supported therefrom by a ball and socket structure, said main and secondary sections including upstanding channel members defining opposite side inwardly opening and open ended confronting grooves and panellike mirror elements each including a pair of generally parallel opposite side marginal portions slidingly received in the corresponding grooves, said channel members each including a pair of end walls removably secured thereto closing the corresponding ends of said grooves, said ball and socket structures being anchored to the opposing end walls of adjacent channel members.

2. The combination of claim 1 wherein said mount includes vertically spaced portions, said main mirror section being supported from said vertically space portions for oscillation about an axis extending between said portions.

3. The combination of claim 1 wherein said mount includes a first pair of generally horizontal support arms convergent toward one pair of corresponding ends thereof and a second inclined support arm disposed in a vertical plane generally bisecting the included angle formed by said horizontal support arms, the upper end of said inclined support arm including an upward extension to opposite sides of whose lower portion the convergent ends of said horizontal support arms are secured, the divergent ends of said support arms including mounting flanges for support of said mount from a support member, said main mirror section being attached to vertically spaced points along said extension above said horizontal arms for oscillation about an upstanding axis extending between said points.

4. The combination of claim 1 wherein said end walls include integral right angled flanges overlying the outer surfaces of the corresponding end marginal edge portions of said mirror elements.

* * * * *